United States Patent
Hager

[15] 3,690,599
[45] Sept. 12, 1972

[54] AIRCRAFT DOCKING GUIDE

[72] Inventor: Ira Vincent Hager, P.O. Box 632, Miami Springs, Fla. 33166

[22] Filed: March 11, 1971

[21] Appl. No.: 123,207

[52] U.S. Cl. .............................. 244/114 R, 340/26
[51] Int. Cl. ............................................. B64f 1/18
[58] Field of Search ........................... 244/114 R; 340/22–26; 33/46 R, 46 AT; 116/28; 356/138, 172

[56] References Cited

UNITED STATES PATENTS 3,003,451   10/1961   Lundin et al. ....... 244/114 R X
3,599,143   8/1971    Brown et al. ................. 340/26

OTHER PUBLICATIONS

Aviation Week & Space Technology, December 12, 1966. page 73. " Light Beam Helps TWA Park Aircraft"

Primary Examiner—Milton Buchler
Assistant Examiner—Paul E. Sauberer
Attorney—John Cyril Malloy

[57] ABSTRACT

An aircraft guide means for use by a pilot in docking an aircraft of the type having a nose wheel. It includes a mirror mounted on the docking line, the mirror being within the line of sight of the pilot and reflecting an image of the docking line at the stopping release so that the pilot can tell when his wheel is at the predetermined stopping point on the docking line. The aircraft includes a light means arranged to be viewed in the mirror which tells the pilot if the plane is askew relative to the docking line. Signal means are provided to be actuated by the nose wheel of the aircraft when it is at the stopping point so that the pilot will stop the aircraft at the proper location.

9 Claims, 8 Drawing Figures

PATENTED SEP 12 1972 3,690,599

INVENTOR.
IRA VINCENT HAGER

BY John Cyril Malloy

ATTORNEY.

AIRCRAFT DOCKING GUIDE

This invention relates to a guidance system for docking aircraft. It is intended to be used to guide an aircraft up to the dock with a minimum of external assistance to the pilot, the pilot being guided by lights or other signal means and a mirror arranged with respect to the signal means and to the docking line. In practice, the aircraft to be docked proceeds along a taxi line and then turns onto the docking line. A signal means, such as a reflector on the taxi line indicates the point where the pilot is to commence his turn onto the docking line. The exact position of the nose wheel at this approach stage is not critical and there are various factors by reason of which it is not exactly precise, such factors as speed in turning, tire slippage and other factors which are beyond the pilot's control. It is critical, however, that it be in a predetermined location in relation to the dock when it stops to unload, and also it is important that the center line of the aircraft be oriented correctly. This invention has these things as an object. In a preferred embodiment, the lead-in line is a row of reflectors, such as six, leading to the docking area. After turning from the taxi line, the pilot brings his nose wheel onto the lead-in or docking line. Also, he is able to ascertain whether or not the aircraft is askew with respect to the docking line by viewing the reflected image in the mirror. As he proceeds to the stopping point on the docking line, the pilot corrects any error in alignment. This system provides a guide so that he can exercise accurately the capability of the aircraft to align directly above the lead-in line so that it is not askew with the lead-in line, which is important with modern wide-bodied aircraft where there are two or more exits along the length of the aircraft. After checking alignment of the aircraft with respect to the docking line, the pilot proceeds forward along the lead-in line to the nose wheel stopping point. The nose wheel stopping point is in a preferred embodiment a pressure sensitive switch which activates a red warning light when depressed. As the pilot nears or approaches the stopping point on the lead-in lines, the pilot has full view of the area so that his approach can be made relatively quickly, and his stopping maneuver can be accomplished smoothly and accurately. Since the precision of docking using this system is high, a loading bridge is not required if one type of aircraft is used continuously at the dock. The passengers are able to board directly from the departure rooms.

It is therefore an object of this invention to provide an improved guide system for docking aircraft which is simple an inexpensive and which does not require outside personnel to aid the pilot.

In the past, as is perhaps well known, a line is painted on the apron about a loading dock and the pilot with the assistance of additional airport personnel guides his aircraft along the lines to a docking station or stopping point. The present invention employs a mirror arranged so that the pilot as he proceeds along the docking line can see the progress he is making as the nose wheel advances. Also, the present invention employs lights on the aircraft, such as one on the starboard and one on the port main wheels so the pilot can tell by the relation of the lights relative to the docking line, if the plane is askew. The lights may be brightened or dimmed by the pilot depending upon light and weather conditions. The mirror may preferably be provided with a light adjacent to it so that it can be seen simultaneously with the reflected image by the pilot. The light is operated in the preferred embodiment by the nose wheel to cause it to signal to the pilot when the stopping point has been reached. There may be approach signals such as a green, orange and red pattern as the advance of the nose wheel takes place.

Figure 1:
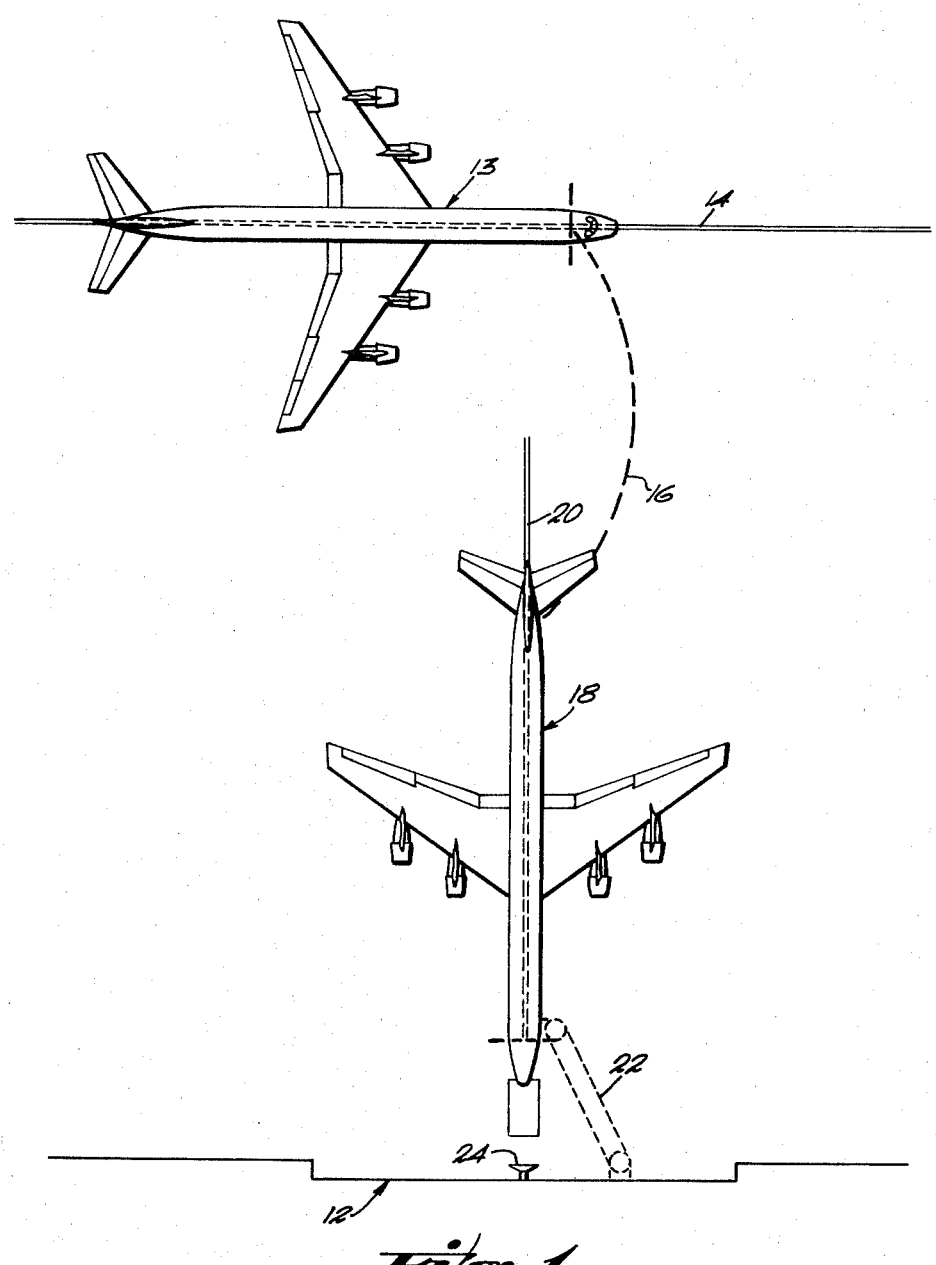
FIG. 1 is a plan view of the skirt of a dock and illustrating the approach of an aircraft to it.
Figure 2:
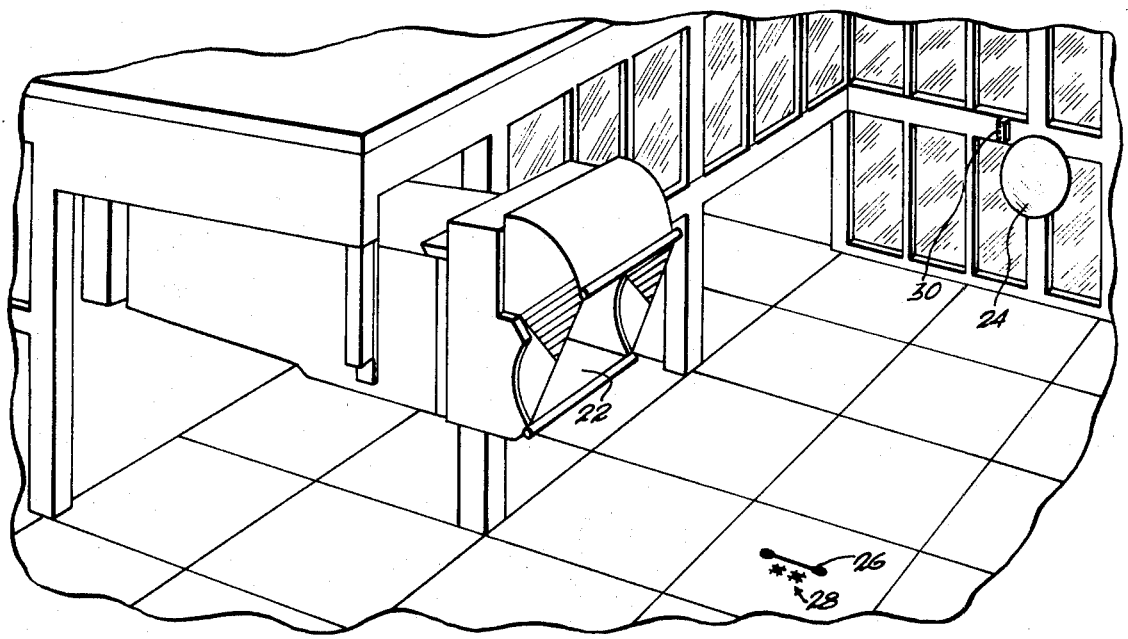
FIG. 2 is an elevation view of the typical dock facility.
Figure 3:
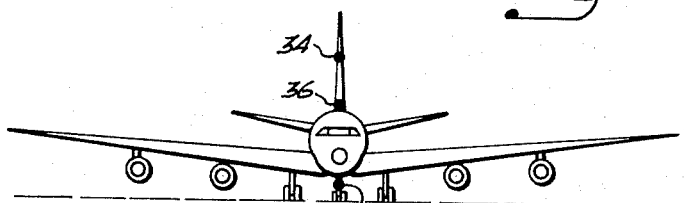
FIGS. 3, 4 and 5 are elevation views of alternatively equipped aircraft as viewed along the docking line.
Figure 3A:
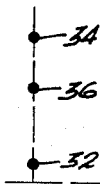
FIGS. 3a, 4a and 5a are schematic illustrations of the lighting arrangement corresponding to FIGS. 3, 4 and 5, respectively.
Figure 4:
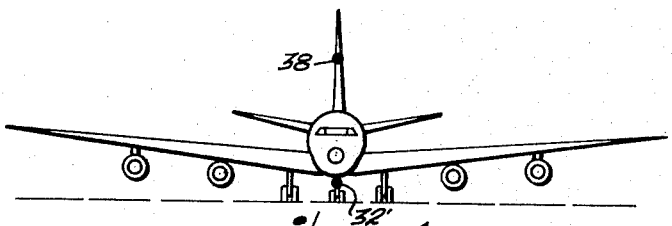
Figure 4A:
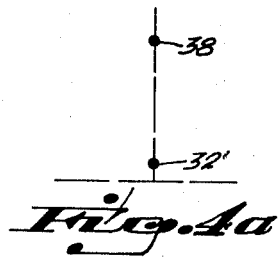
Figure 5:
Figure 5A:
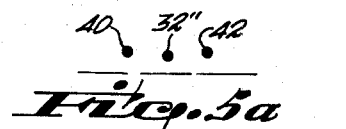

Referring to the drawings wherein like reference characters designate like or corresponding parts throughout the several views, there is illustrated the edge of a docking facility designated by the numeral 12 and an aircraft 13 which is on a taxi line 14 about to enter onto a docking line 16 to a docking position indicated by the aircraft 18 on a docking line, the extension of which is indicated by the numeral 20. The docking facility is provided with a loading bridge or ramp 22 which is adapted to be extended to surround the exit of the aircraft. A mirror 24 is provided on the extension of the docking line at the docking surface and at a heighth which is such that it is within the range or line of sight of the pilot as he advances on the docking line and also such that it reflects an image of the stopping point 26 of the nose wheel of the aircraft, which has been predetermined in advance to be proper for the type aircraft and the location of the loading bridge. At the stopping point the pressure sensitive switch 28 is provided which actuates a signal means 30 closely adjacent the mirror 24 in the preferred embodiment so that the pilot will know by a visual signal that the nose wheel is at the proper location. As the aircraft advances along the docking line, the pilot is able to orient it in alignment with the docking line by means of lights carried on the aircraft which are visible through the mirror. A central light is provided on the centerline of the aircraft preferably on the nose wheel as indicated by the numerals 32, 32' and 32'' in FIGS. 3, 4 and 5. The aircraft is also provided with a second light means spaced from the light means adjacent the nose wheel, in the case of FIG. 3 this light being a pair of lights 34 and 36 on the centerline of the aircraft one forward and one aft. In the case of FIG. 4, it is a single light 38 located on the centerline of the aircraft, and in the case of FIG. 5 it is a pair of lights, one on each of the main wheel carriages 40 and 42. In any event, as indicated in FIGS. 3a, 4a and 5a the pilot is able to determine from the relative location of the lights as he views them in his mirror whether or not the centerline of the plane is askew or not with respect to the docking line.

With this system it is seen that the pilot aligns the plane so that it is not askew but, rather, is directly in line with the docking line and, when at the stopping point, is accurately located on the docking line. The pilot is able to see visually the stopping point which has been predetermined to be the proper place to stop for unloading. He can execute the docking maneuver smoothly and accurately because of this visual contact which he maintains. The mirror dies not have to be positioned exactly in order to give accurate results but a limited range or margin of error is permitted, that is there are no high tolerances requiring special fixtures or the like. The view of the stop light is straight ahead rather than to either side so that the pilot immediately receives the signal from the signal means or stop light telling him that his nose wheel is in the correct location. The system does not require additional reflective devices for wide-bodied aircraft and the pilot can see the stopping device at any distance within reason. In other words, the pilot has the control of brightness by the control of the lighting system and the system has an internal safety check for reliability. Because the system is utilized directly by the pilot there is no danger of human error in the transmission of information to the pilot who remains in visual contact at all times.

What is claimed is:

1. Aircraft guide means for use by a pilot in docking an aircraft having a nose wheel at a predetermined stopping point and attitude on a docking line extending from a dock without the aid of additional personnel, said aircraft including an orientation light means spaced from the nose wheel, said means comprising:

mirror means having a reflective surface transverse of the line, a switch on the line and operable by the aircraft nose wheel, said switch being located at about the stopping point of the nose wheel on the line, a signal means electrically connected to the switch and operable to signal the pilot when the nose wheel is at the stopping point, means supporting the mirror with the attitude of the reflector surface being such that it is in the line of sight from the cockpit of the aircraft when the nose wheel is on the line at the switch and the surface is also on a reflective line from the mirror to the stopping point.

2. The aircraft guide means as set forth in claim 1 wherein the signal means comprises a visual signal in the range of vision of the aircraft cockpit.

3. The guide as set forth in claim 1 wherein a plurality of signal means in alignment with one another are provided along the line and provide a visual indication of the line toward the stopping point.

4. The aircraft guide means as set forth in claim 3 wherein the said plurality of signal means are spaced from one another at predetermined location to provide a visual indication of progress along the line forward the stopping point.

5. The device as set forth in claim 3 wherein said signal means comprise reflector means.

6. The device as set forth in claim 4 wherein said signal means comprise reflector means.

7. The guide as set forth in claim 1 wherein taxi line means are provided to guide the aircraft to the docking line.

8. The device as set forth in claim 7 wherein a signal means is provided on the taxi line to indicate the point to turn on the docking line.

9. The guide as set forth in claim 1 wherein the signal means comprises a pair of lights.

* * * * *